United States Patent Office 3,076,010
Patented Jan. 29, 1963

3,076,010
BIS (HYDROXYALKYL) AMINO ALKYL PHOSPHONIC ACID DIESTERS
Thomas M. Beck, Homewood, and Edward N. Walsh, Chicago Heights, Ill., assignors to Stauffer Chemical Company, New York, N.Y., a corporation of Delaware
No Drawing. Filed Mar. 25, 1960, Ser. No. 17,474
5 Claims. (Cl. 260—461)

This invention relates to novel dialkylalkanolaminoalkylphosphonates and to certain copolymers which may be made therefrom.

In particular this invention relates to certain dialkyl dialkanolaminoalkylphosphonates which may be copolymerized with isocyanate compounds to render the resulting compositions flame resistant. The resulting flame-resistant compositions may be used in the form of expanded foamed products as thermal insulation. By using the technique of foaming-in-place such insulation has found wide use in the manufacture of refrigerators and aircraft components wherein such foams add strength as well as flame resistance to the components.

The new compounds of this invention may be represented by the general formula:

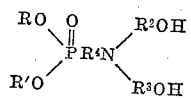

wherein R and $R^1$ may be the same or different alkyl or haloalkyl radicals and $R^2$ and $R^3$ may be the same or different lower alkylene radicals and $R^4$ is a lower alkylene radical.

These new compounds may be made according to the following general reaction:

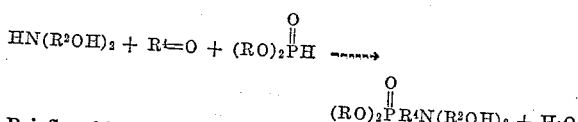

Briefly, this reaction may be said to involve the reaction of a dialkanolamine, an aldehyde or ketone, and a dialkyl phosphite. Suitable dialkanolamines for the purpose of this invention include such compounds as diethanolamine, dipropanolamine, ethanol propanolamine, dibutanolamine, dioctanolamine, etc.

Suitable aldehydes or ketones are such well-known compounds as formaldehyde, acetaldehyde, butyraldehyde, furfural, acetone, methyl ethyl ketone, etc.

Dialkyl phosphites which are suitable are dimethyl phosphite, diethyl phosphite, methyl ethyl phosphite, dipropyl phosphite, dibutyl phosphite, dioctyl phosphite, and haloalkyl phosphites such as di-(beta-chloroethyl) phosphite, di-(beta-fluoroethyl) phosphite, di-(beta-bromoethyl) phosphite, etc.

The following examples illustrate the process of making these new compounds.

EXAMPLE 1

Preparation of Diethyl N,N Diethanolaminomethylphosphonate

To 30.9 g. of diethanolamine was added 24.4 g. of aqueous 37% formaldehyde while stirring at 20–30° C. in a reaction flask equipped with thermometer, and dropping funnel. Diethyl phosphite, 41.4 g., was then added dropwise while stirring and holding the temperature at 21–35° C. Both of the above reactions were exothermic. The reaction mixture was held at 35° C. with cooling until the exothermic reaction was complete in about 40 minutes and was then cooled below 30° C. The mixture was further stirred at room temperature and then heated to 50° C. for 15 minutes. After cooling it was extracted with 100 ml. of ether and the resulting aqueous phase was then concentrated by distillation under reduced pressure. The residue at 50° C. under 1 mm. pressure was collected as the diethyl N,N-diethanolaminomethylphosphonate product. It had an index of refraction $n_D^{25} = 1.4649$, weighed 72.5 g. (94.8% yield) and analyzed as 12.3% P, 4.9% N (theory 12.2 and 5.5 respectively).

EXAMPLE 2

Preparation of Dimethyl N,N-Diethanolaminomethylphosphonate

Following the procedure of Example 1, 407 g. of aqueous 37% formaldehyde was added to 525 g. of diethanolamine while stirring at 25° C. To the resulting solution was slowly added 550 g. of dimethyl phosphite. The reaction was exothermic so the temperature was held below 35° C. during the addition period of 55 minutes. The reaction mixture was heated to 50° C. for 30 minutes and then cooled. Volatiles were removed under reduced pressure to 80° C. at 1 mm. of mercury. The resulting dimethyl N,N-diethanolaminomethylphosphonate weighed 1091.3 g. and analyzed as 13.8% P and 5.8% N (theory 13.7 and 6.2).

EXAMPLE 3

Preparation of Dibutyl N,N-Diethanolaminomethylphosphonate

Following the procedure of Example 1, 407 g. of aqueous 37% formaldehyde was added to 525 g. of diethanolamine while stirring at 20–25° C. To the resulting solution was added 970 g. of dibutyl phosphite while keeping the temperature at 25–30° C. The addition took 20 minutes and the mixture was then stirred without cooling for 69 minutes during which time the temperature rose to 39° C. It was allowed to stand overnight at room temperature, heated to 50° C. and cooled again to room temperature. Water and volatiles were removed by heating to 50° C. at 2 mm. of mercury to give 1532 gm. (98%) of clear, light yellow dibutyl diethanolaminomethylphosphonate. The product analyzed as 4.8% N (theory 4.5%).

EXAMPLE 4

Preparation of Bis (Betachloroethyl) N,N-Diethanolaminomethylphosphonate

Following the procedure of Example 1, 163 g. of 37% aqueous formaldehyde was added to 210 g. of diethanolamine at 25–30° C. in 15 minutes. To the resulting solution 414 g. of bis (betachloroethyl) phosphite was added at 20–30° C. over a 35 minute period. The mixture was stirred at 25–30° C. for 2⅓ hours and then heated to 50° C. for one hour. Water and volatiles were removed by heating to 50° C. at 1 mm. of mercury. The resulting bis (betachloroethyl) diethanolaminomethylphosphonate weighed 622.6 g. (96%), had an index of refraction $n_D^{25} = 1.5020$ and analyzed as 9.2% P and 19.8% Cl (theory 9.6 and 21.9).

An outstanding use for these new phosphonate compounds is in providing flame resistance for isocyanate or polyurethane foam formulations. The phosphonates may be used individually or we have also found that various mixtures of these new compounds provide excellent flame resistance. Due to the presence of the hydroxyl groups in the alkanolamine portion of the molecule, these compounds actually react with the isocyanates in the formation of urethane foams to produce flame resistant copolymers. In this respect they may replace some or all of the polyol generally used in such formulations.

The production of urethane or isocyanate polymers is a well-known commercial process, see for instance Kirk-Othmer, The Encyclopedia of Chemical Technology, First Supplement, pages 888 et seq., (Interscience 1957). Briefly, this process involves the reaction of an isocyanate and a second compound which may contain an hydroxyl, amino or carboxy group, i.e. a compound containing active hydrogen. As used in this specification the term "isocyanate material" is intended to include isocyanate or urethane compositions containing unreacted —NCO radicals.

The most common polymers are formed by the reaction of toluene diisocyanate (hereafter TDI) and a saturated polyester. (This latter compound may however, contain benzene unsaturation.) Representative polyesters are the reaction products of adipic acid and/or phthalic anhydride and ethylene glycol. Other compounds which may be used in place of the polyesters are polyethers, simple glycols, polyglycols, castor oil, drying oils, etc. Whether the products are to be flexible or rigid depends upon the degree of cross-linking and thus the type of polyol which is used. Since the products of this invention may replace only a part of the polyol, they are thus suitable for use in either flexible or rigid foams.

When an expanded or foamed product is to be produced, it is the general practice to add water to the composition. The water reacts with the —NCO groups to release $CO_2$ and cause the expansion of the polymer into a foamed mass.

Control of this reaction requires considerable skill and often special equipment. In some cases it has been found advisable to use inert dissolved gases including the various halohydrocarbons such as the well known Freons or Genetrons. These low boiling liquids boil when warmed by the heat of reaction and thus cause foaming. They also serve to lower the thermal conductivity and increase the flame resistance of the resulting foam. The term "foaming agent" as used herein is intended to include both reactive materials such as water and inert materials such as halohydrocarbons which cause the copolymers to form an expanded foam.

In addition to the actual reactants and foaming agents it is also desirable in many cases to add a small amount of a surfactant in order to provide a more homogeneous mixture.

The following examples illustrate the use of our new compounds in forming flame resistant polyurethane foamed products.

EXAMPLE 5

To 10 g. of a semi-prepolymer made up of 80 parts toluene diisocyanate (80% being the 2,4 isomer, 20% being the 2,6 isomer) and 20 parts of a phthalic-adipic type polyester prepolymer resin (hydroxyl number 500) were added 12.25 grams of the following mixture:

9.7 g. diethyl diethanolaminomethylphosphonate (from Example 1).
2.5 g. trichloromonofluoromethane (Freon 11).
0.05 g. silicone surfactant (L–521).

The mixture was stirred at room temperature in a paper container and allowed to expand. A rigid light yellow foam resulted. It occupied a volume of approximately 250 cc. A small piece of this foam burned slightly when held in the flame of a Bunsen burner; was immediately self-extinguishing when removed from the flame.

EXAMPLE 6

In a manner similar to Example 5 10 g. of phthalic-adipic type prepolymer and 12 g. of the following mixture were mixed together:

84 g. dimethyl diethanolaminomethylphosphonate (Example 2).
25.0 g. trichloromonofluoromethane.
0.5 g. silicone surfactant.

The reaction was rapid and the foam expanded to a volume of about 180 cc. The foam hardened rapidly and was self-extinguishing.

EXAMPLE 7

In a manner similar to Example 5 the following mixture was prepared:

115 g. dibutyl diethanolaminomethylphosphonate (Example 3).
0.5 g. silicone surfactant.
25 g. trichloromonofluoromethane.

14 grams of this mixture and 10 grams of adipic-phthalic type prepolymer were mixed together and gave a rapid reaction with much swelling. The foam did not harden quickly. A piece of the foam was found to be self-extinguishing.

EXAMPLE 8

In a manner similar to Example 5 the following mixture was prepared:

120 g. bis (betachloroethyl) diethanolaminomethylphosphonate (Example 4).
0.5 g. silicone surfactant.
25 g. trichloromonofluoromethane.

14.5 grams of this mixture and 10 grams of adipic-phthalic type prepolymer were mixed and the reaction was initiated with 2 drops of triethylamine. A slow foaming resulted to give a hard, self-extinguishing foam.

EXAMPLE 9

In a manner similar to Example 5 the following mixture was prepared:

48 g. diethyl diethanolaminomethylphosphonate (Example 1).
60 g. bis (betachloroethyl) diethanolaminomethylphosphonate (Example 4).
0.5 g. silicone surfactant.
25 g. trichloromonofluoromethane.

14.6 grams of this mixture and 11.0 g. of the adipic-phthalic type prepolymer were mixed together. About 200 cc. of rigid, self-extinguishing foam was produced.

The preceding examples have been designed to produce primarily rigid foams. The following example illustrates the production of a flexible foam:

EXAMPLE 10

A prepolymer containing 9.5% —NCO was first prepared by blending, under dry nitrogen, 100 g. of a polypropylene glycol with a molecular weight of about 2000 and 0.6 g. of water at 40° C. for 20 minutes. To this mixture was added 17.7 g. of TDI over a 30 minute period. The temperature rose 6° C. during the addition and was then raised to 120° C. over a 20 minute period and stirred at that temperature for 45 minutes. It was then cooled to 50° C. over a 30 minute period and then 12.75 g. of diethyl diethanolaminomethylphosphonate and 10.3 g. of TDI were added. The temperature was then raised to 120° C. over a 30 minute period and stirred for an additional 45 minutes. The prepolymer was completed by cooling to 50° C., adding 27.3 g. TDI and stirring for 30 minutes at 50° C. It was stored under dry nitrogen.

To prepare the flexible polymer 100 g. of the prepolymer was first mixed with 0.5 g. of a silicone surfactant (L–520) at room temperature for 15 minutes. Into this mixture was stirred 2.3 g. of water for one minute and then it was immediately poured into a 1250 cc. box coated with a silicone mold release. After 15 minutes the expanded foam was cured at 70° C. for 8 hours. It was then removed from the mold, compressed three times to ⅛ its total volume and cut into 1″ slabs. These slabs were cured 12 hours at 85° C. The resulting flexible foam had a density of 0.10 g./cc. and a phosphorus content of 0.89%.

For purposes of comparison a similar prepolymer containing 9.5% —NCO was prepared from the same polypropylene glycol and TDI using a similar process. A flexible foam was then prepared following the above procedure except that a mixture of 1.0 g. of N-methyl morpholine and 0.3 g. of triethylamine were mixed in rapidly just prior to pouring into the mold. A flexible resin with a density of 0.6 g./cc. resulted.

In order to compare the flame resistance of the two foams ¾" x ¾" x 3" pieces of the foams were suspended vertically and ignited with a Bunsen burner. The phosphorus-free foam ignited readily and burned completely in 35 seconds. The foam containing diethyl diethanolaminomethylphosphonate was difficult to ignite and required 65 seconds to burn completely.

In performing the foregoing examples ordinary commercial grade materials have been used, with the exception of our new compounds. These commercial compounds are readily available in most instances. This is particularly true of the aldehydes, ketones, alkanolamines and dialkyl phosphites used. In formulating the urethane foams we have used a number of commercially available polyesters, polyethers, polyols, surfactants and foaming agents as well as prepared prepolymer mixtures containing these compounds. Since it is often difficult to ascertain the exact composition of these commercial compositions, the examples have been limited to the use of definitely identified materials.

The exact proportions of reactants necessary to produce the flame resistant copolymers are not too critical. Stoichiometric quantities can be readily calculated from the hydroxyl number of the polyol (or the amount of active hydrogen in the case of amino or carboxy groups) and the number of —NCO groups in the isocyanate. Generally speaking, however, an excess of isocyanate of 5–15% of the stoichiometric amount is used.

For the purpose of flameproofing the final copolymer in accordance with the present invention we find that it is necessary to add at least about 3% P and preferably about 4% P in the form of the dialkyl dialkanolaminoalkylphosphonate. Again this may be easily calculated from the physical constants of the reactants.

We have found it desirable to form a prepolymer by first reacting the TDI with sufficient polyester or polyol to reduce the amount of the remaining —NCO groups to about 30–35% of the weight of the prepolymer. Since TDI has a normal —NCO content of about 48%, the formation of the prepolymer results in reducing the —NCO content by about 25%. This is primarily a process expedient, however, and is not necessary to the practice of the invention.

The foregoing detailed description is given for clearness of understanding only and no unnecessary limitations should be derived therefrom.

We claim:
1. Dialkyl dialkanolaminoalkylphosphonates having the formula:

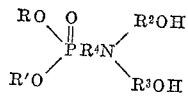

wherein R and R¹ are selected from the group consisting of lower alkyl and lower haloalkyl radicals, R² and R³ are lower alkylene radicals and R⁴ is a lower alkylene radical.

2. Dimethyl diethanolaminomethylphosphonate.
3. Diethyl diethanolaminomethylphosphonate.
4. Dibutyl diethanolaminomethylphosphonate.
5. Bis (betachloroethyl) diethanolaminomethylphosphonate.

References Cited in the file of this patent
UNITED STATES PATENTS

| | | |
|---|---|---|
| 2,570,503 | Tawney | Oct. 9, 1951 |
| 2,635,112 | Fields | Apr. 14, 1953 |
| 2,847,442 | Sallmann | Aug. 12, 1958 |
| 2,875,232 | McConnell et al. | Feb. 24, 1959 |
| 2,901,445 | Harris | Aug. 25, 1959 |
| 2,953,533 | Khawam | Sept. 20, 1960 |

UNITED STATES PATENT OFFICE

CERTIFICATE OF CORRECTION

Patent No. 3,076,010                      January 29, 1963

Thomas M. Beck et al.

It is hereby certified that error appears in the above numbered patent requiring correction and that the said Letters Patent should read as corrected below.

Column 1, line 29, and column 6, line 21, for "R and $R^1$" each occurrence, read -- R and $R'$ --.

Signed and sealed this 3rd day of September 1963.

(SEAL)
Attest:

ERNEST W. SWIDER
Attesting Officer

DAVID L. LADD
Commissioner of Patents